(12) United States Patent
Le

(10) Patent No.: US 7,446,980 B2
(45) Date of Patent: Nov. 4, 2008

(54) METHOD FOR MANUFACTURING A STITCHED "FLOATING" TRAILING SHIELD FOR A PERPENDICULAR RECORDING HEAD

(75) Inventor: Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 553 days.

(21) Appl. No.: 10/976,476

(22) Filed: Oct. 29, 2004

(65) Prior Publication Data

US 2006/0092564 A1   May 4, 2006

(51) Int. Cl.
 *G11B 5/33* (2006.01)
 *G11B 5/127* (2006.01)
(52) U.S. Cl. .................................. 360/319; 29/603.15
(58) Field of Classification Search ................ None
 See application file for complete search history.

(56) References Cited

U.S. PATENT DOCUMENTS

| | | | | |
|---|---|---|---|---|
| 4,489,484 | A |   | 12/1984 | Lee ............................. 29/603 |
| 5,543,989 | A |   | 8/1996 | Westwood .................. 360/113 |
| 6,286,200 | B1 | * | 9/2001 | Huang et al. ............. 29/603.12 |
| 6,393,692 | B1 | * | 5/2002 | Ju et al. .................... 29/603.14 |
| 6,524,491 | B1 | * | 2/2003 | Liu et al. ...................... 216/22 |
| 6,655,009 | B2 | * | 12/2003 | Huang et al. ............. 29/603.15 |
| 6,722,018 | B2 | * | 4/2004 | Santini .................... 29/603.12 |
| 6,857,181 | B2 | * | 2/2005 | Lo et al. .................. 29/603.15 |
| 2002/0048126 | A1 |   | 4/2002 | Shimazawa ................ 360/320 |
| 2002/0159200 | A1 | * | 10/2002 | Ju et al. ...................... 360/318 |
| 2002/0191351 | A1 | * | 12/2002 | Santini ...................... 360/317 |
| 2003/0021063 | A1 |   | 1/2003 | Kuroda et al. .............. 360/125 |
| 2003/0117749 | A1 |   | 6/2003 | Shukh et al. ............... 360/317 |
| 2005/0007698 | A1 | * | 1/2005 | Kudo et al. ................ 360/126 |
| 2005/0057851 | A1 | * | 3/2005 | Oike et al. ................. 360/110 |

OTHER PUBLICATIONS

E. Leung, M. Hayashi, R. Leung, K. Ino, N. Matono, S. Takahashi, M. Fujita, "Writer Performance Improvement in MR Head With Oversized Trailing Poles Technique," Magnetics, IEEE Transactions on, vol. 34, Issue 4, Jul. 1998.

* cited by examiner

*Primary Examiner*—David D Davis
(74) *Attorney, Agent, or Firm*—Zilka-Kotab, PC

(57) ABSTRACT

A bi-layer, floating, trailing shield for use in a perpendicular magnetic recording system and a method for manufacturing such a trailing shield. Manufacturing the trailing shield as a bilayer trailing shield allows certain critical alignments to be maintained during lithography and allows high resolution photolithographic procedures to be used by allowing the use of a thinner resist, especially during construction of the first layer of the bilayer trailing shield structure. A trailing shield according to an embodiment of the invention improves magnetic performance of the write head by canting the magnetic write field from the write pole.

19 Claims, 14 Drawing Sheets

METHOD FOR MANUFACTURING A STITCHED "FLOATING" TRAILING SHIELD FOR A PERPENDICULAR RECORDING HEAD

FIELD OF THE INVENTION

The present invention relates to perpendicular magnetic recording and more particularly to a novel trailing magnetic shield design and a method for manufacturing such a shield design.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (ie. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. Various dimensions of the shield are critical for the floating trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively.

As the write pole's track-width aggressively scales toward smaller dimensions to achieve higher areal density, the trailing shield throat height proportionally scales roughly to ½ of the write pole's trackwidth. These design parameters make fabrication of the trailing shield increasingly difficult for higher density magnetic recording designs. The difficulty of this design can be understood by the following example: 80 nm trackwidth write pole and 50 nm trailing shield throat height from ABS for 240 Gbit/in$^2$ write head. The example indicates that the fabrication of the trailing shield requires tight control of the shield thickness in the stripe height direction (ie. in the direction perpendicular to the ABS). In addition, the area of the trailing shield as viewed from the ABS must be sufficiently to provide sufficient permeability for effective flux shielding while not being so large and permeable as to steal flux from the write pole.

Maintaining such tight tolerances while constructing a shield with sufficient area (as viewed from the ABS) cannot be achieved with existing manufacturing techniques. Achieving high resolution and tight alignment requires low wavelength (193 nm or less). Such high resolution and tight alignment can be achieved, for example using a 157 nm stepper tool. However, use of such a low wavelength limits the thickness of the photoresist that can be used and therefore limits the thickness of the structure that can be plated. In other words, a shield having a tall dimension in the down track direction (height as viewed from the ABS) can not be constructed in using the necessary high resolution low wavelength photolithography, because such a low wavelength photolithography cannot produce a sufficiently tall (ie. Thick) photoresist frame.

Therefore there is a need for a method of manufacturing a floating trailing shield that will alleviate the challenges of aligning the shield with underlying write head structures while also providing a shield having the dimensions needed for efficient shielding. Such a method for constructing a trailing shield would preferably not significantly increase manufacturing cost of complexity and would use presently available manufacturing techniques.

SUMMARY OF THE INVENTION

The present invention provides a method of constructing a magnetic write head for perpendicular magnetic recording, the magnetic write head having a trailing shield. The method includes depositing a non-magnetic, electrically conductive seed layer over a write pole along with an anti-reflective layer (ARC). A first photoresist frame is then constructed to having a first opening that exposes a portion of the write pole. A reactive ion etching (RIE) is carryout to transfer the first photoresist frame into the anti-reflective layer. A first layer of magnetic material is then deposited into the opening to form a first portion of the trailing shield. A second photoresist frame is then formed having a second opening that exposes a portion of the first magnetic layer. A second layer of magnetic material is then deposited to form a second portion of the trailing shield.

Constructing the trailing shield in two steps allows for easier manufacture with improved accuracy. Because the shield is constructed in two steps, the first portion of the shield can be formed with a much thinner photoresist layer, allowing the use of high resolution photolithography such as 193 nm deep ultraviolet (DUV) and allows much better alignment with underlying structures. Such alignment is critical to proper performance of the shield. The second portion of the shield can then be constructed, being aligned with the first portion of the shield structure where the alignment can be less aggressive allowing the use of a 248 nm DUV photolithography and thicker resist to improve the shield permeability.

The seed layer can be for example Rh and can have a thickness of 35-45 nm. It should be noted that the seed layer functions defines the gap between the write pole and the trailing shield. Therefore, the thickness of the seed layer will depend upon the areal density of the recording system, which dictates the size of the gap needed between the write head and the trailing shield. Since the gap is thin, the material selected for the seed layer should have a high conductivity, in order to be sufficiently conductive for electroplating the trailing shield. For this reason, Rh is an excellent candidate for the seed layer material.

Before depositing the seed layer, a layer of non-magnetic, electrically insulating material can be deposited and chemical mechanically polished to form a fill layer having a smooth planar upper surface that is coplanar with the upper surface of the write head. This advantageously allows the seed layer along with ARC such as Silicon Oxynitride ($SiO_xN_y$), first photoresist frame and first portion of the trailing shield to be formed on a smooth planar surface for improved resolution.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
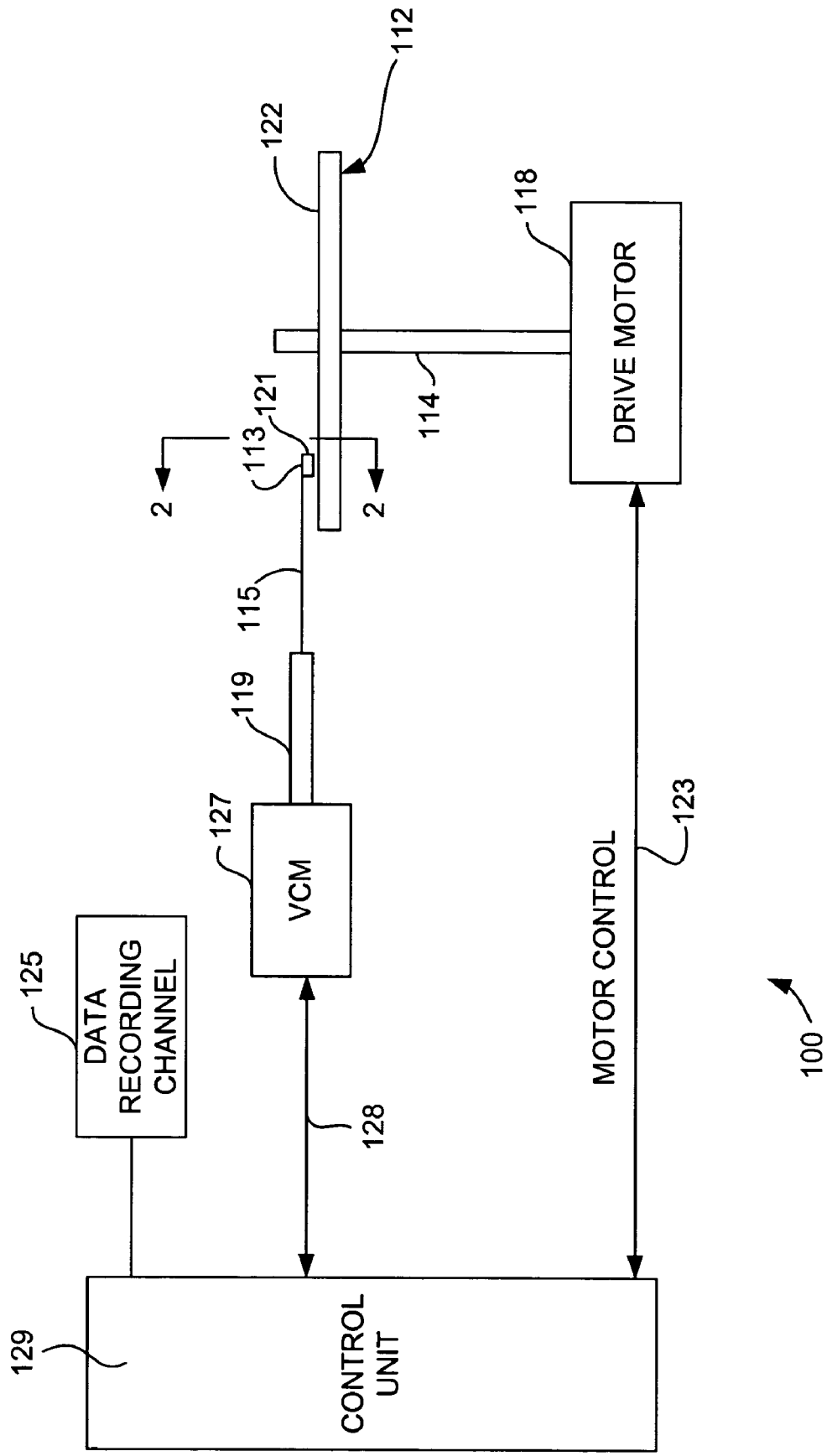
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
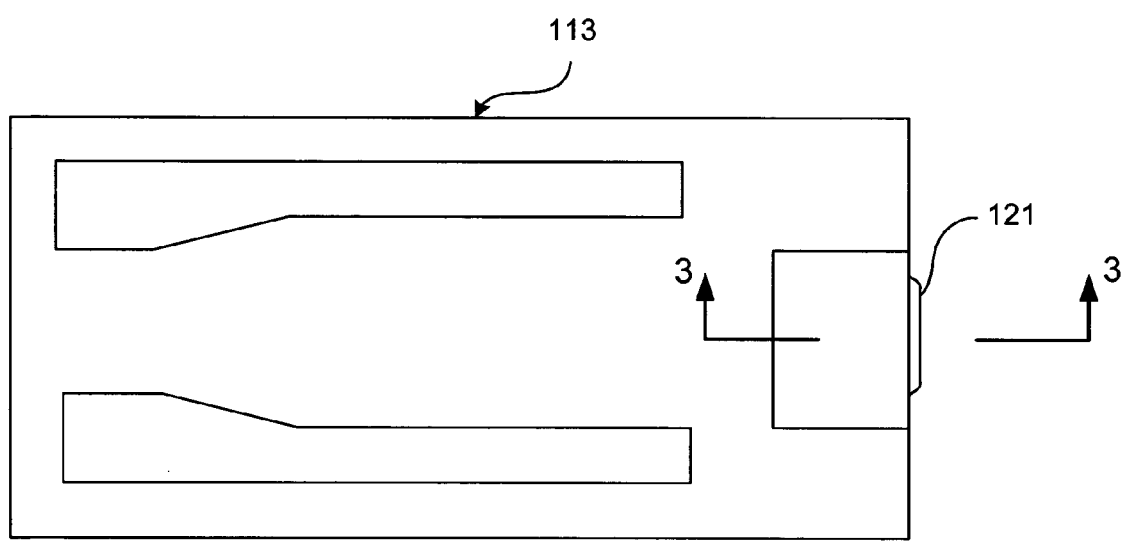
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
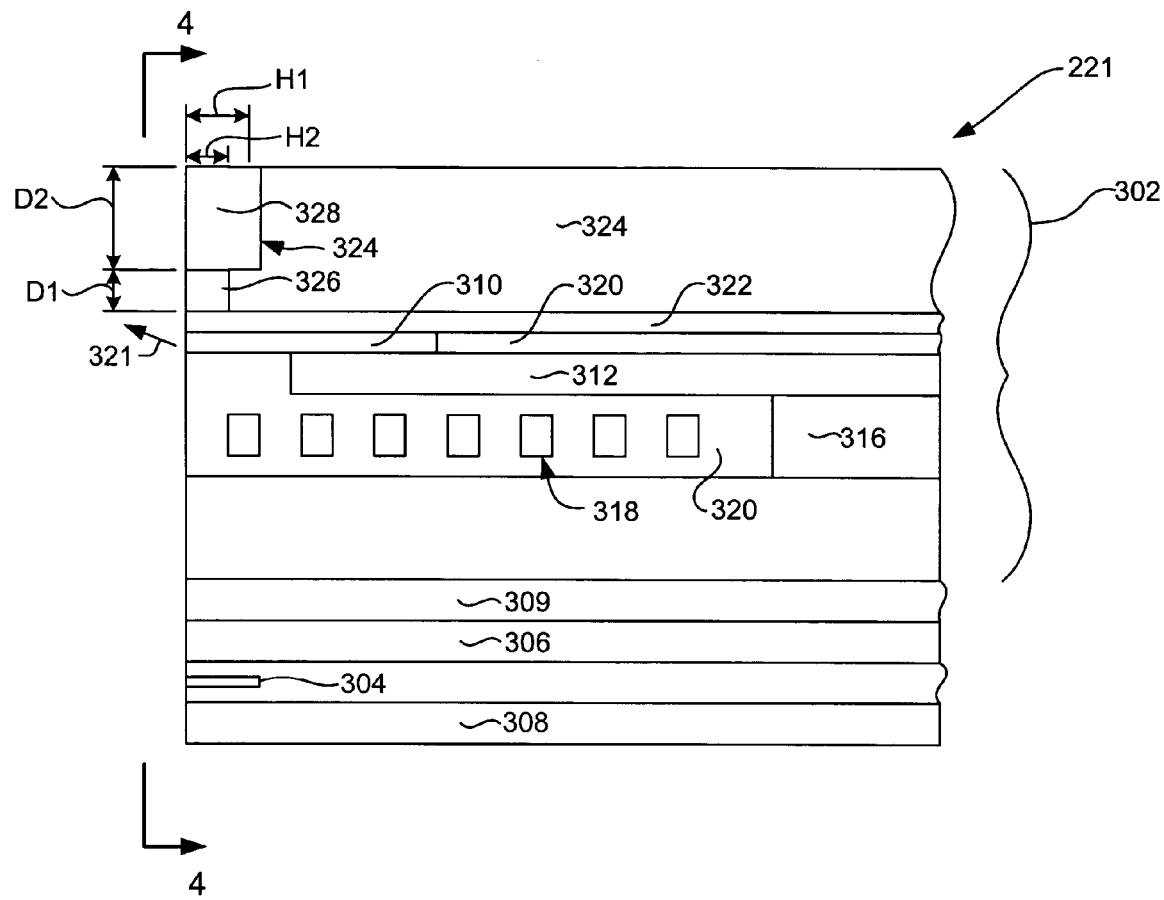
FIG. 3 is a cross sectional view view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read sensor 304. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 304 could be another type of sensor such as a current in plane (CIP) GMR sensor or, a tunnel junction sensor (TMR) or some other type of sensor. The sensor 304 is located between and insulated from first and second magnetic shields 306, 308. The magnetic shields, which can be constructed of for example CoFe or NiFe, absorb magnetic fields, such as those from uptrack or down track data signals, ensuring that the read sensor 304 only detects the desired data track located between the shields 306, 308. A non-magnetic, electrically insulating gap layer 309 may be provided between the shield 306 and the write head 302.

With continued reference to FIG. 3, the write element 302 includes a write pole 310, that is magnetically connected with a magnetic shaping layer 312. The write pole has a small cross section at the air bearing surface ABS and is constructed of a material having a high saturation moment magnetic material such as FeNi or CoFe. The shaping layer 312 is constructed of a magnetic material such as CoFe or NiFe and has a cross section parallel to the ABS surface that is significantly larger than that of the write pole 310.

The write element 302 also has a return pole 314 that preferably has a surface exposed at the ABS surface and has a cross section parallel with the ABS surface that is much larger than that of the write pole 310. The return pole 314 is magnetically connected with the shaping layer 312 by a back gap portion 316. The return pole 314 and back gap 316 can be constructed of, for example, NiFe, CoFe or some other magnetic material.

An electrically conductive write coil 318, shown in cross section in FIG. 3, passes through the write element 302 between the shaping layer 312, and the return pole 314. The write coil 318 is surrounded by an electrically insulating material 320 that electrically insulates the turns of the coil 318 from one another and electrically isolates the coil 418 from the surrounding magnetic structures 310, 312, 316, 314. When a current passes through the coil 318, the resulting magnetic field causes a magnetic flux to flow through the return pole 314, back gap 316, shaping layer 312 and write pole 310. This magnetic flux causes a write field 321 to be emitted toward an adjacent magnetic medium.

The write head element 302 also includes a two part shield 324. The two part shield 324 is constructed with a first layer 326 which is relatively thin in the direction parallel with the data track D1 and relatively thin in the throat height direction H1 (ie. perpendicular to the ABS). The shield 324 also includes a second layer 328 that is relatively thick in the data track direction D2 and relatively thick in the throat height direction H2. D1 is preferably greater than or equal to about 4 times the trailing shield gap thickness to minimize write flux lost from the write pole to the shield. In one possible embodiment of the invention, D1 is 0.3-0.4 um and D2 is the remaining shield thickness of D1+D2=1 um. H1 can be about ½ the trackwidth of the write pole to minimize write flux lost to the shield while still maintaining the desire write field canting. With the second shield being located further from the write pole, its fabrication can be relaxed, allowing D2 to be straight or curved and H2 placement to be less critical than the H1 placement of the first shield.

The bi-layer shield 324 allows the first layer 326 to be defined by a thin photoresist layer for improved alignment and tight overlay, which allows the first layer 326 be constructed with a straight wall profile to define the back-edge of the trailing shield and to decrease flux leakage from the write pole 310 to the trailing shield 324. The second layer 328 increases the thickness of the trailing shield in the direction parallel with the data track D2 to improve the trailing shield's permeability. The second layer 328 allows the throat height dimension to be slightly less aggressive than the first shield.

With continued reference to FIG. 3, a non-magnetic dielectric fill material 320 is preferably provided on top of the shaping layer 312 and has an upper surface that is coplanar with the upper surface of the write pole 310. The fill layer 320 can be constructed of for example $Al_2O_3$. A non-magnetic, electrically conductive seed layer 322 is formed over the fill layer 320 and the write pole 310. The seed layer 322 can be for example Ta/Rh or some other non-magnetic, electrically conductive material. By constructing the seed layer 322 of a non-magnetic material, the seed layer 322 can be left intact, covering the entire head finished head 221.

Figure 4:
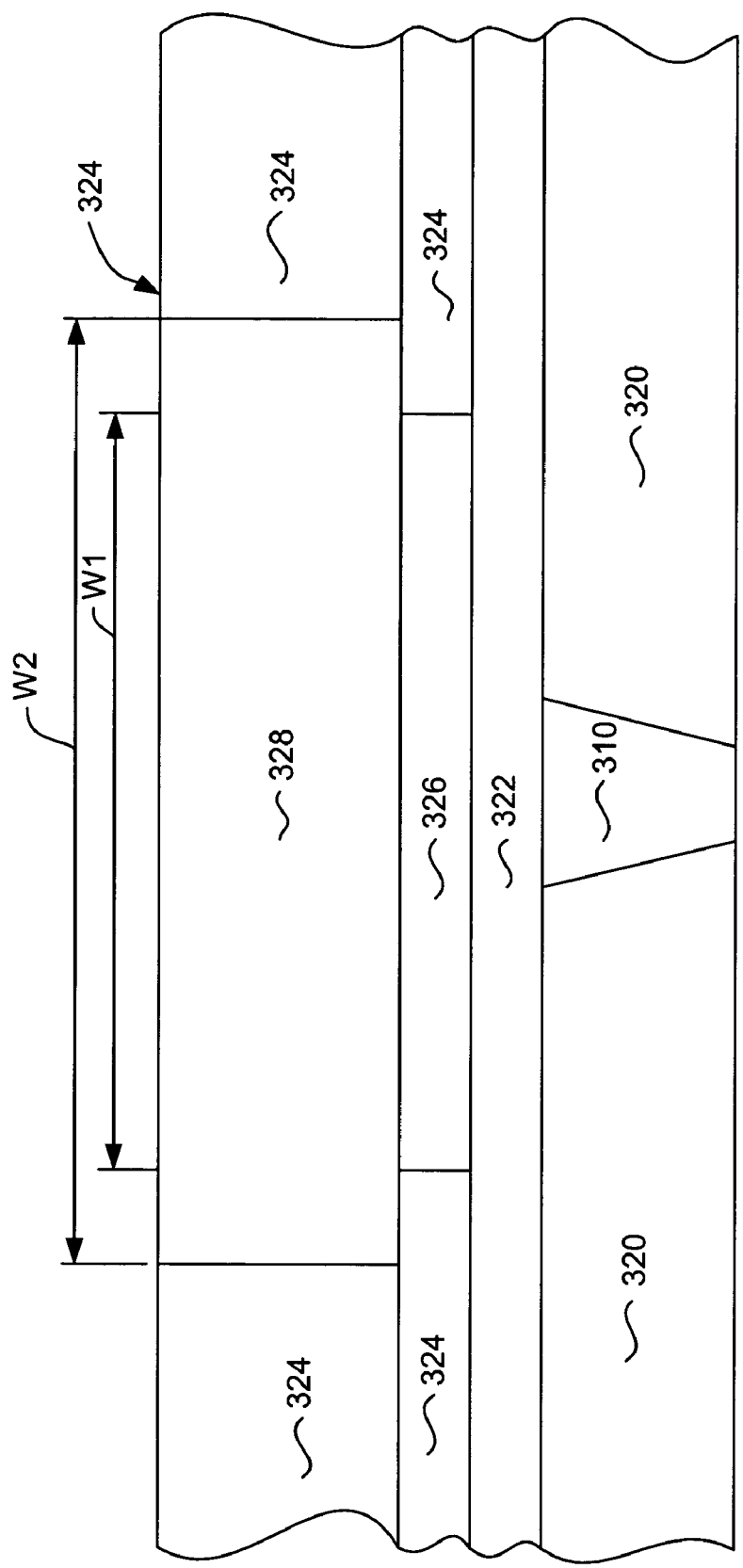
FIG. 4 is an ABS view taken from line 4-4 of FIG. 3 and enlarged.
Figure 5:
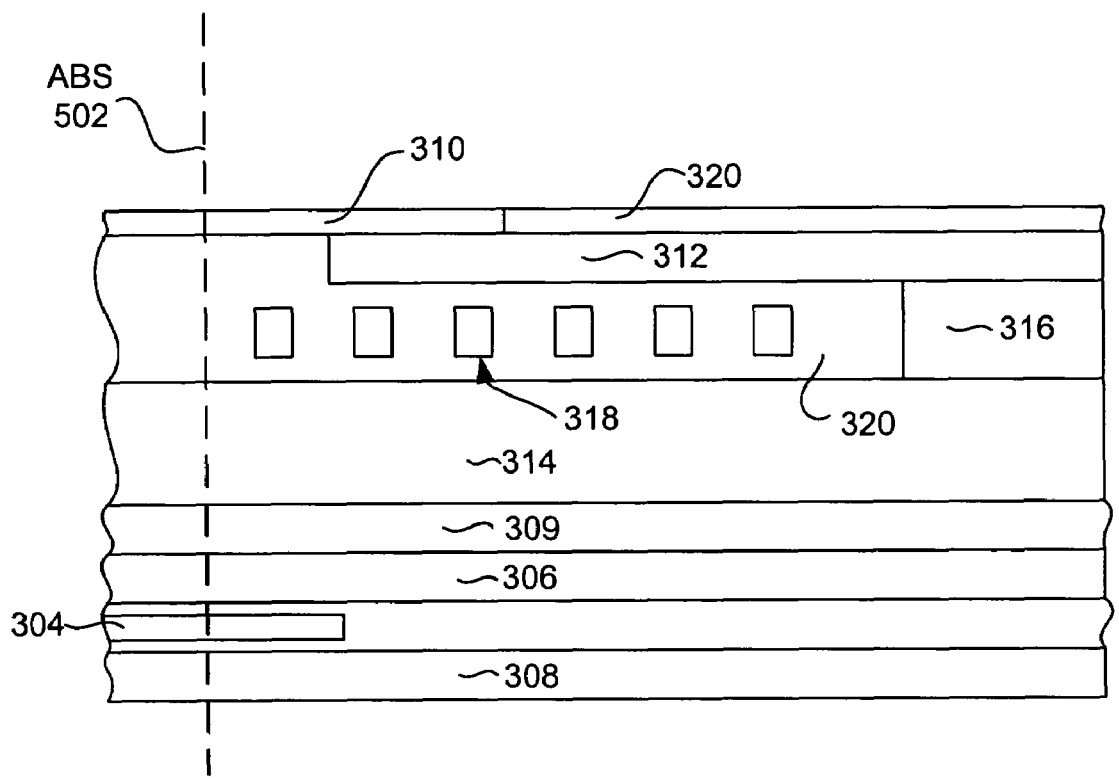
FIGS. 5-10 are cross sectional views, similar to that of FIG. 3, illustrating a magnetic head according to an embodiment of the invention in various intermediate stages of manufacture.

With reference to FIG. 4, which illustrates an ABS view of the write pole 310 and trailing shield, it can be seen that the first layer 326 can have a lateral width W1 that is different than the lateral width W2 of the second layer 328. In the case of a studded trailing shield design, which will be discussed further herein below, the width W2 of the second layer 328 is preferably greater than that of the first layer 326. Because of the unique bi-layer shield design, the dimensions and placement of the first layer 226 can be adjusted as desired to maximize performance and increase ease of manufacture. The dimensions of the W1, D1 and H1 are critical to maximum performance whereas the dimensions of the W2, D2, H2 are less critical and can be relaxed. Because the thickness D1 can be decreased in this novel bi-layer shield design than would be possible using a single layer shield, the critical dimensions H1, W1 can be accurately controlled using a low wavelength photolithographic process.

With reference now to FIGS. 5-10 a method for manufacturing a write head having a bi-layer trailing shield according to the present invention will be described. With specific reference to FIG. 5, the write head is constructed according to methods familiar to those skilled in the art to include the read sensor 304, read sensor shields 306, 308, return pole 314, back gap 316 write coil 318, insulation layer 320, shaping layer 312, and write pole 310. A layer of non-magnetic, electrically insulating material 320 such as alumina $Al_2O_3$ is then deposited and a chemical mechanical polishing (CMP) process is performed to form a smooth upper surface on the fill layer 320 that is coplanar with the upper surface of the write pole 310. It should also be pointed out that at this point in the manufacturing process, the ABS surface has not been constructed. This will be performed much later in the manufacture of the head, wherein a lapping process will be performed to remove material down to the level of an ABS plane 502.

Figure 6:
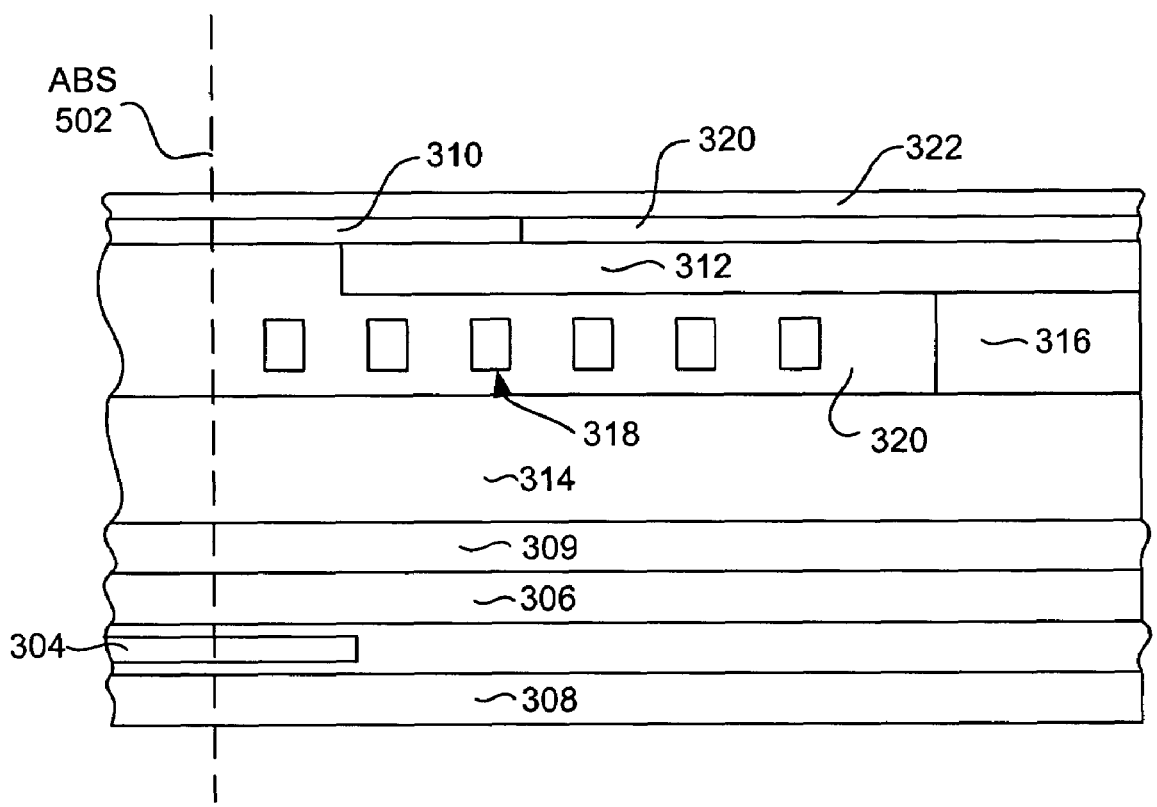

With reference now to FIG. 6, a non-magnetic, electrically conductive seed layer 322 is deposited. This seed layer can be for example Ta/Rh and can be deposited for example by sputtering to have a thickness of 35-45 nanometers depending on the head and soft underlayer spacing. The thickness of the seed layer 322 defines the gap between the write pole 310 and the trailing shield 324. This gap between the write pole 310 and the trailing shield 324 is preferably equal to the distance between the head to soft underlayer of the medium (not shown). As can be seen, this seed layer 322 is deposited over a smooth planar surface, which allows for excellent thickness (ie. gap) control.

Figure 7:
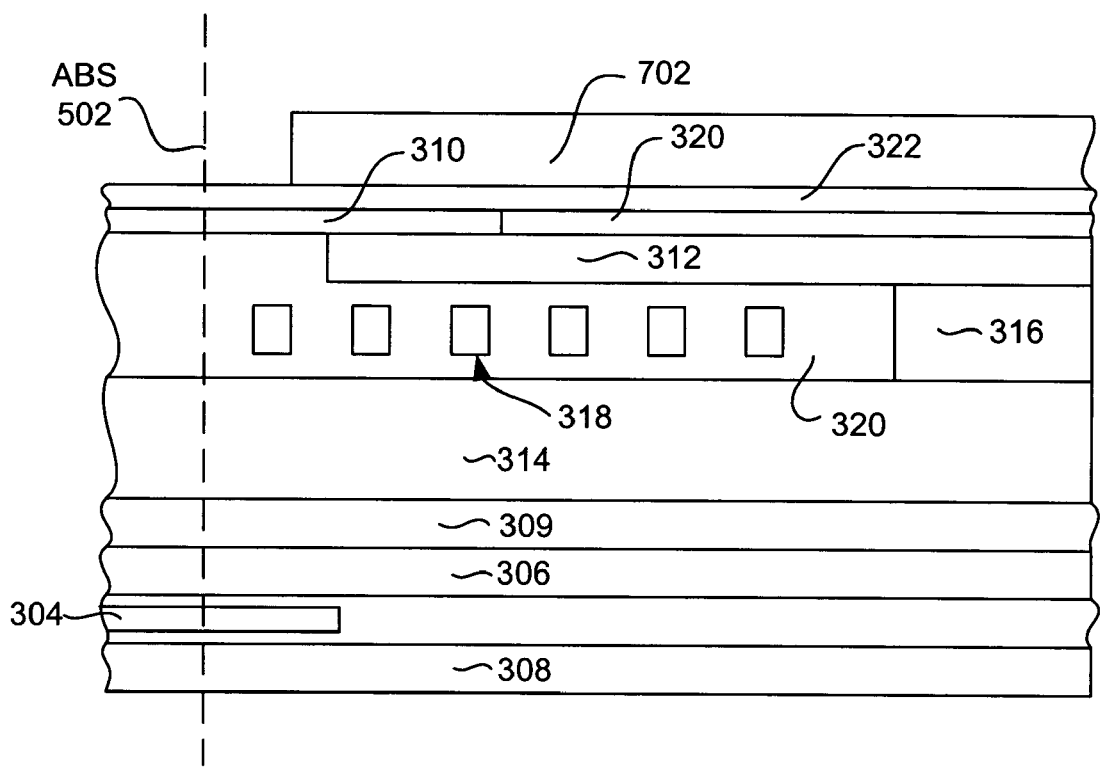

Thereafter, with reference to FIG. 7, a layer of ARC is deposited then photoresist and photolithographically patterned to form a first photoresist frame 702. It should be pointed out at this point that the use of the two part shield 324, allows this first photoresist frame 702 to be constructed much thinner than would otherwise be possible. This allows for improved alignment with the write pole 310. Alignment of the photoresist frame 702 with the write pole 310 in the throat height direction (perpendicular to the ABS) is critical so that when the head is lapped to the ABS line 502, the shield will have the desired height in the stripe height direction ($H_2$ in FIG. 3). The photoresist frame 702 can be patterned by a high resolution photolithographic process such as by 193 nanometer Deep Ultraviolet (DUV) resist photo then RIE is carryout to image transfer the image into ARC. ARC thickness is chosen so that RIE selectivity favors ARC over the 193 DUV silicon containing resist.

Figure 8:
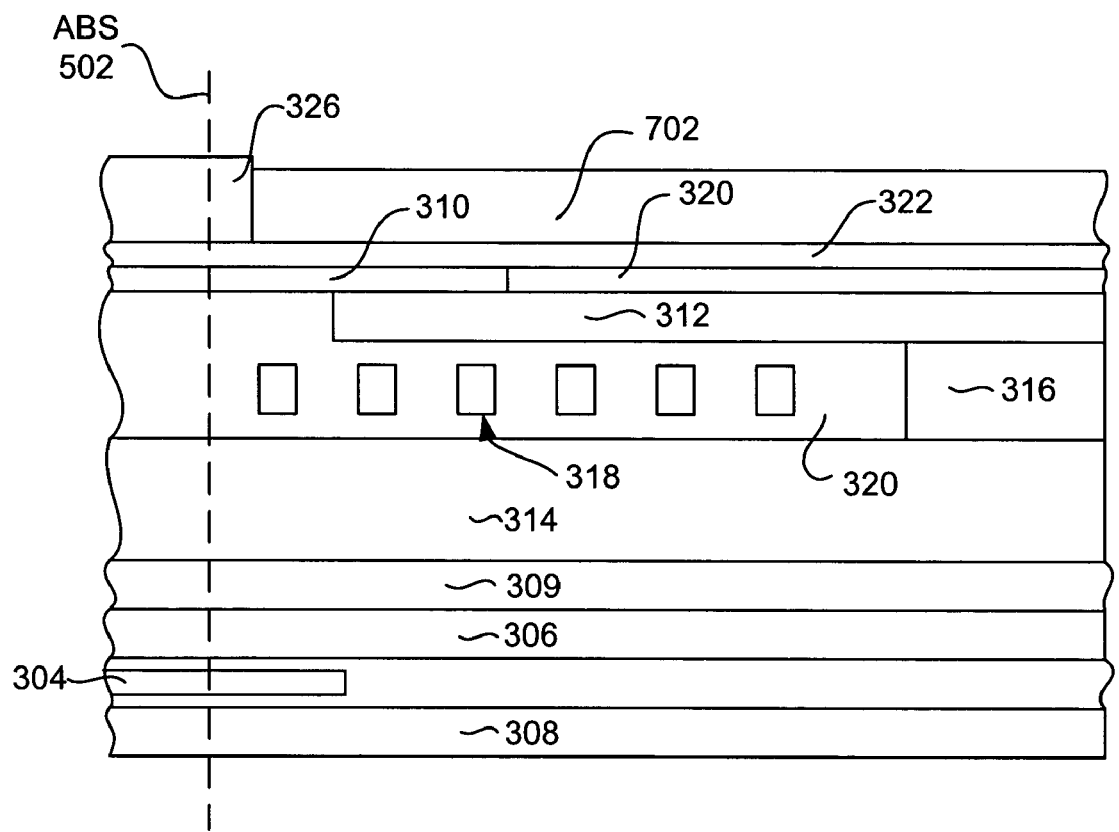
Figure 9:
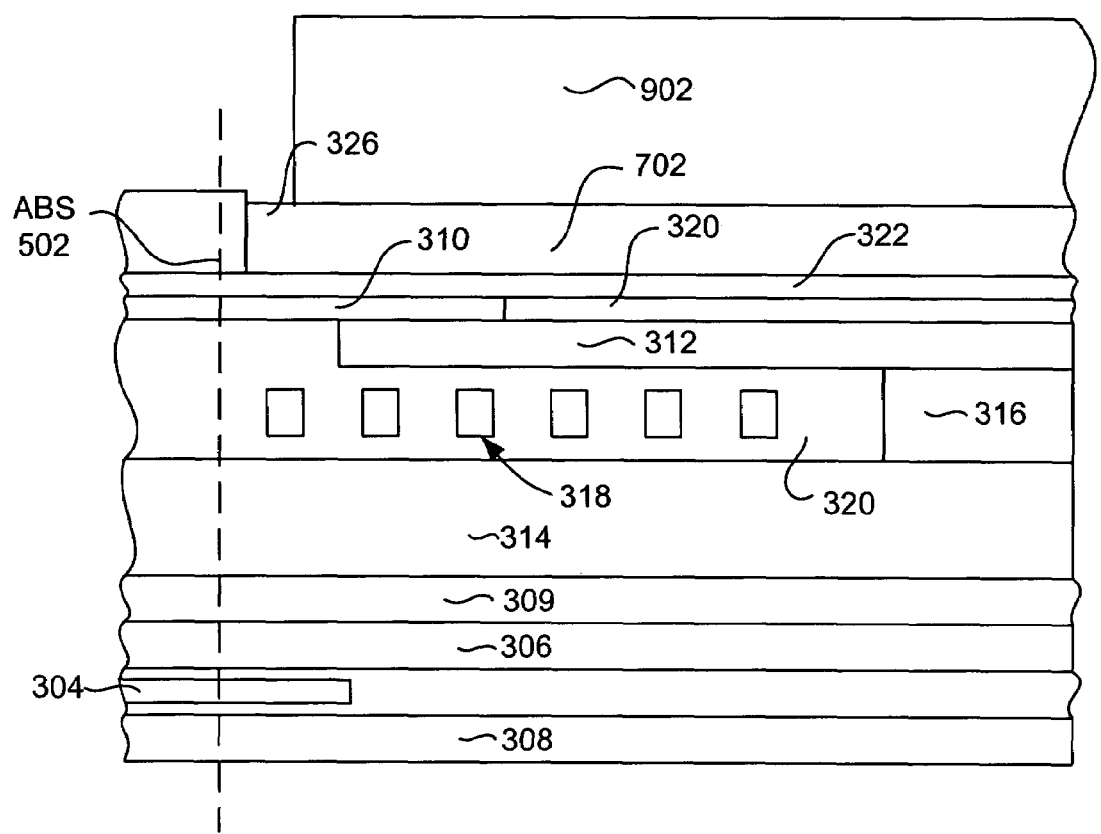

With reference now to FIG. 8, the first portion 326 of the trailing shield 324 is deposited into the ARC frame 702. The first portion 326 can be deposited by electroplating and can be formed of a high Bsat material such as, for example, NiFe. With reference to FIG. 9, a second photoresist frame 902 is constructed. This second photoresist frame is formed with the first ARC frame 702 left intact. In the area behind the ABS, the antireflective coating (ARC) is left intact. The patterning of the second shield layer 328 is preferably done within the first shield 326 to expose the ARC. After the second shield is plated, a reactive ion etch RIE can be performed to remove ARC material exposed at the ABS.

Figure 10:
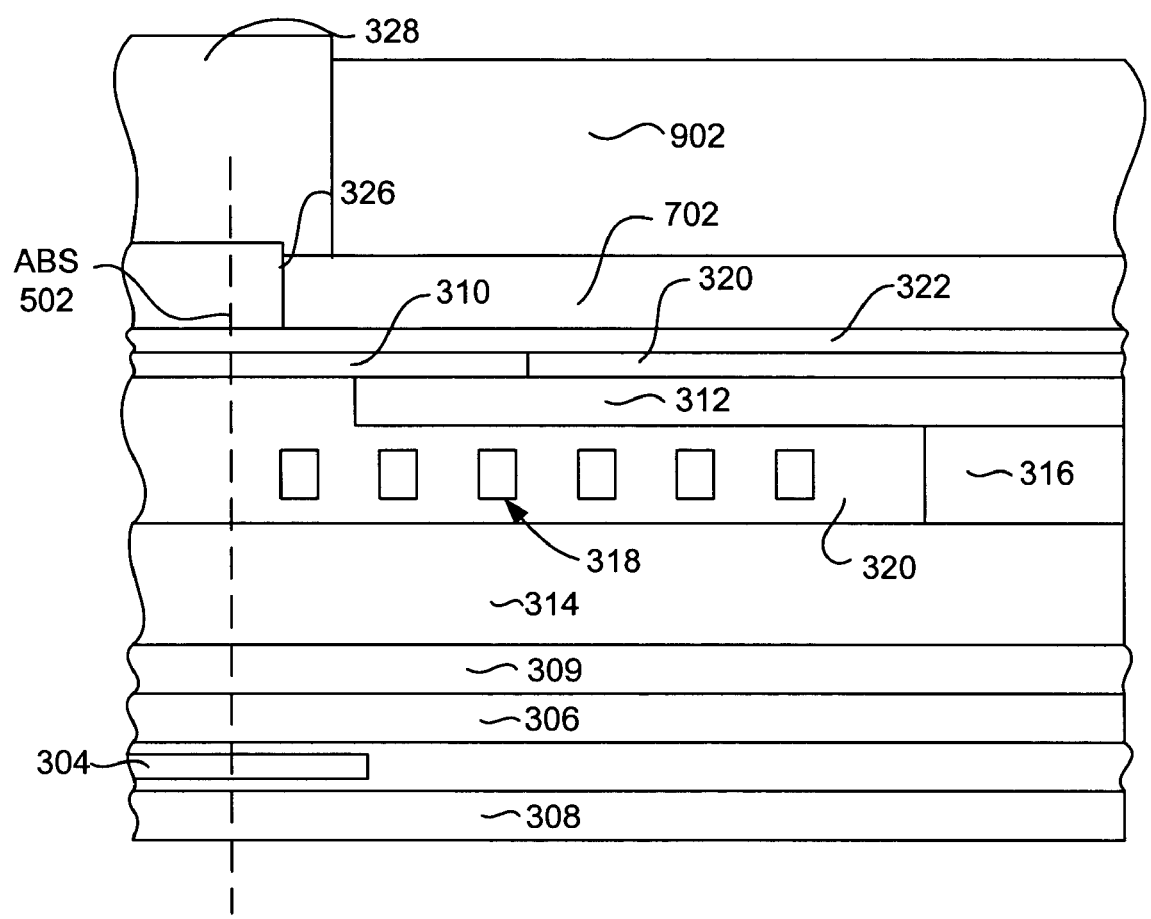

With reference now to FIG. 10, the second portion 328 of the trailing shield 324 can be deposited such as by electroplating a high Bsat material such as NiFe into the second photoresist frame 902. Thereafter, other further construction of the head can include deposition of addition insulation material (not shown) and cutting and lapping to the ABS plane 502 to form the air bearing surface (ABS) of the head 221. As mentioned above, because the seed layer 322 is non-magnetic, it can be left intact.

Figure 11:
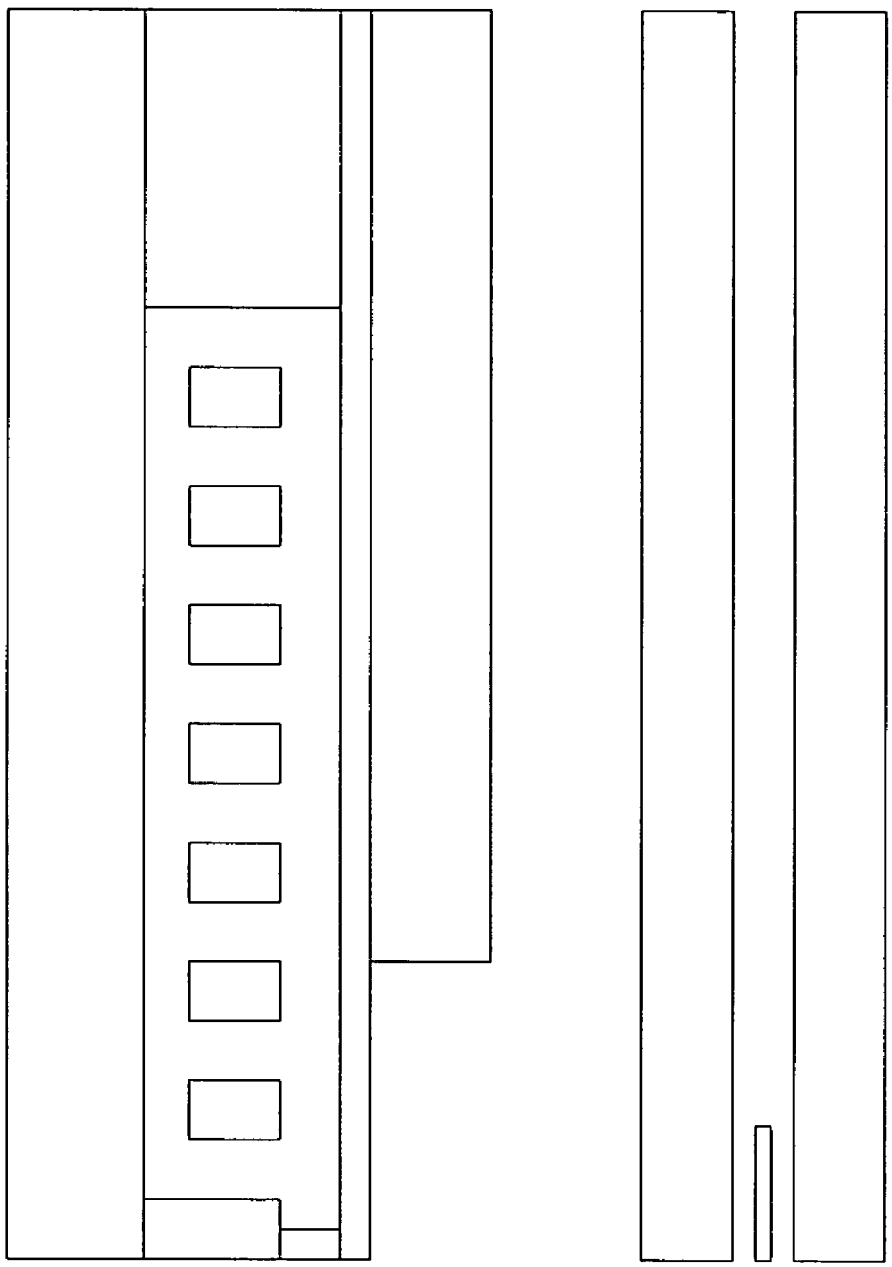
FIG. 11 is a cross sectional view of an alternate embodiment of the invention.

With reference now to FIG. 11, the invention may be embodied in a magnetic write element 1102 having a trailing shield 1104 that is directly connected with a trailing return pole 1106. The trailing return pole 1106 is magnetically connected with a write pole 1108 by a back gap 1110. The trailing shield 1104 in this embodiment includes first and second layers 1112, 1114, similar to the trailing shield 324 of the previously described embodiment. The write pole 1108 is preferably connected with a shaping layer 1116, and a coil 1118 passes between the write pole 1108 and return pole 1106.

Figure 12:
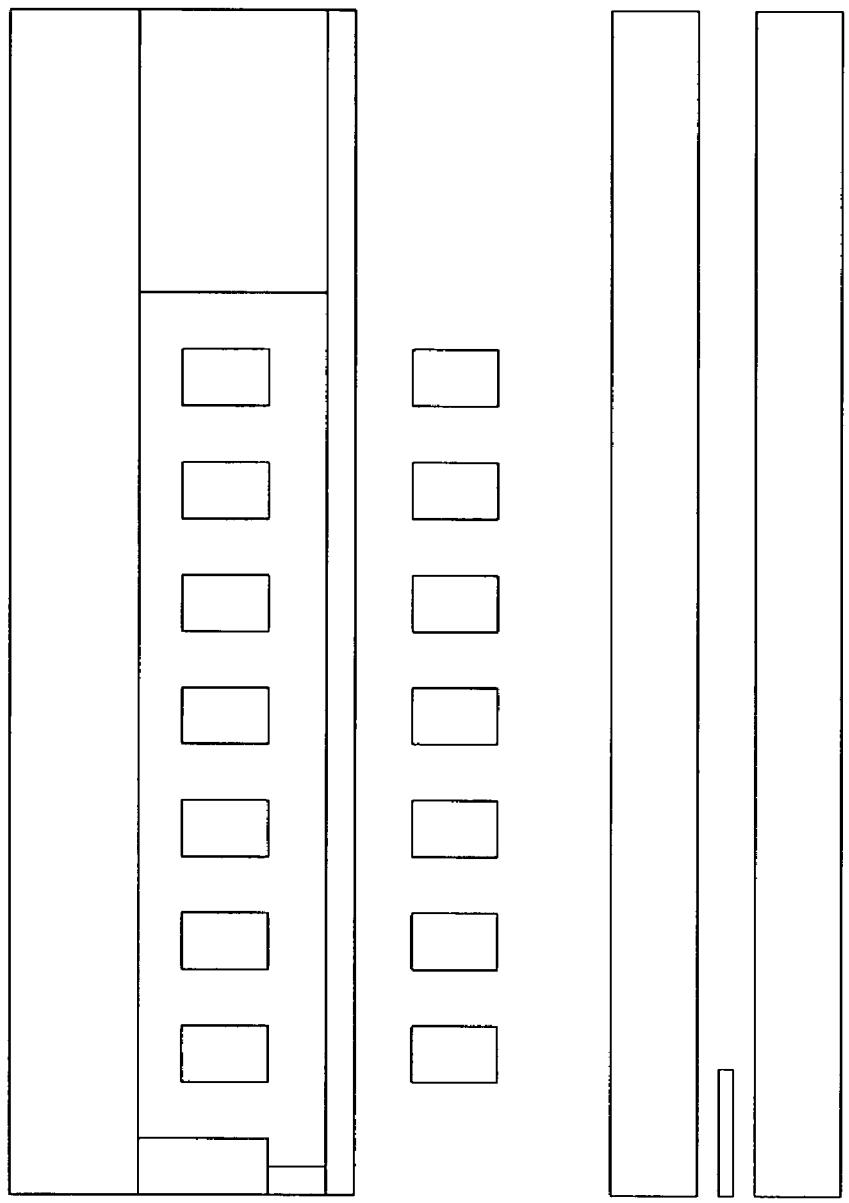
FIG. 12 is a cross sectional view of another alternate embodiment of the invention.

With reference now to FIG. 12, yet another embodiment includes a write element 1202 having a trailing shield 1204 connected with a trailing return pole 1206, and includes a write pole 1208 connected with the return pole 1206 by a back gap 1208. The write element 1204 also has first and second write coils 1210, 1212 located at either side of the write pole 1204. The trailing shield 1204 includes first and second layers 1214, 1216.

Figure 13:
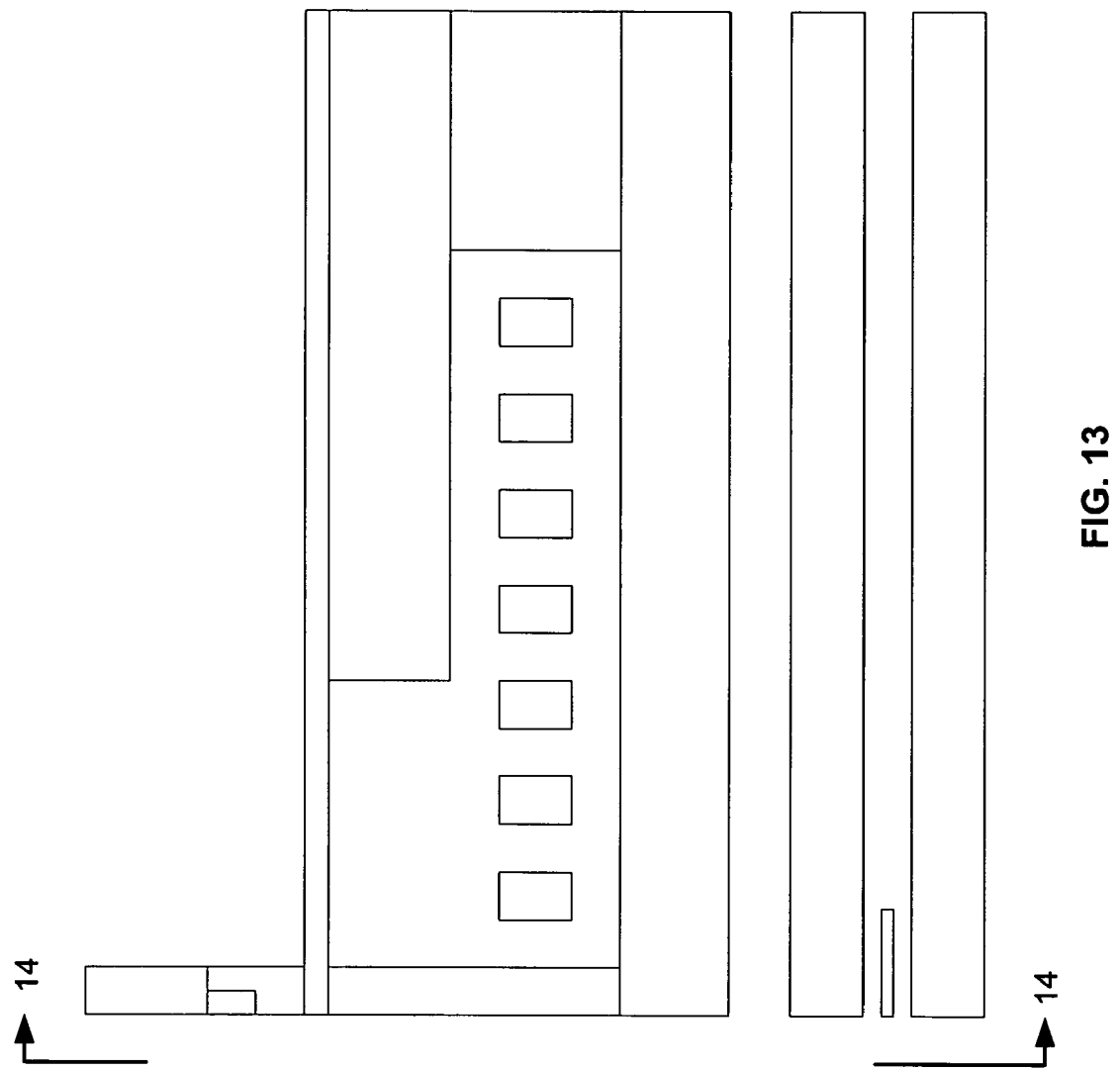
FIGS. 13-14 are cross sectional and ABS views respectively of yet another alternate embodiment of the invention.
Figure 14:
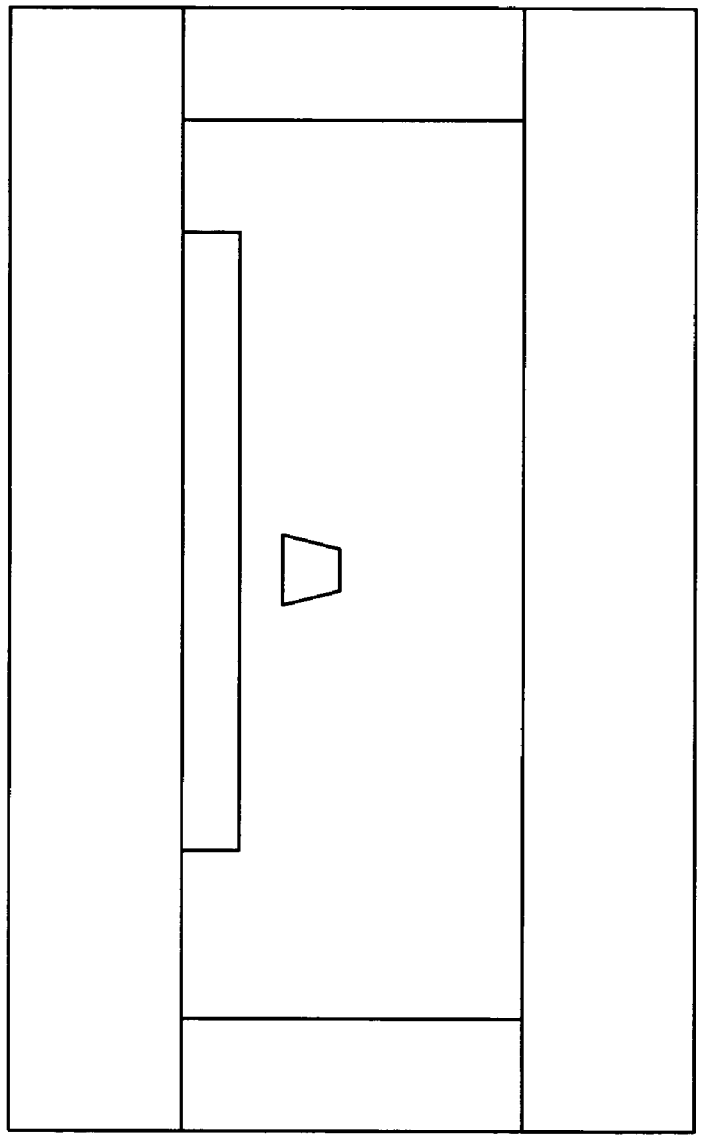

With reference now to FIGS. 13 and 14, a the present invention can be embodied in a write element 1302 having a studded trailing shield design 1304. This embodiment includes a write pole 1306 connected to a shaping layer 1308, which is connected to a return pole 1310 via a backgap 1312. A coil 1314 passes between the write pole 1306 and shaping layer 1308 and the return pole 1310. The trailing shield 1304 is connected to the return pole 1310 by first and second studs 1316, 1318, only one of which is seen in FIG. 13.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method of constructing a bi-layer trailing shield for a perpendicular magnetic write element, the method comprising:
    forming a magnetic write pole for perpendicular magnetic recording;
    depositing a non-magnetic, electrically insulating fill material;
    performing a chemical mechanical polishing process (CMP);
    after performing the chemical mechanical polishing (CMP), depositing a non-magnetic, electrically conductive seed layer;
    forming a first photoresist frame over the seed layer, the photoresist frame having an opening that exposes a portion of the underlying seed layer;
    depositing a first layer of magnetic material into the opening in the first photoresist frame;
    forming a second photoresist frame, the second photoresist frame having an opening that exposes at least a portion of the first layer of magnetic material; and
    depositing a second layer of magnetic material into the opening in the second photoresist frame.

2. A method as in claim 1, wherein the seed layer has a thickness that is equal to about ½ the intended distance between the write pole and a soft underlayer of a magnetic medium of a disk drive apparatus during use of the disk drive apparatus.

3. A method as in claim 1, wherein the first photoresist frame is constructed by a photolithographic processes that comprises deep ultraviolet lithography.

4. A method as in claim 1, wherein the first photoresist frame is constructed by a photoresist process that comprises 193 nm deep ultraviolet (DUV) lithography.

5. A method as in claim 1, wherein at least one of the first layer and second layers of magnetic material comprise NiFe.

6. A method as in claim 1, wherein the seed layer comprises Rh.

7. A method as in claim 1, wherein the first photoresist frame is patterned by a deep ultraviolet photolithography at a wavelength of 193 nanometers or less.

8. A method as in claim 1; wherein the first magnetic layer has a first thickness D1 measured in a down track direction that is 0.3-0.4 um.

9. A method as in claim 1 wherein the CMP is performed sufficiently to form a smooth coplanar upper surface across the fill material and the write pole.

10. A method as in claim 1 wherein the fill material comprises $Al_2O_3$.

11. A method as in claim 1 wherein the write pole comprises a CoFe and the fill material comprises $Al_2O_3$.

12. A method as in claim 1 wherein the write pole comprises $Co_{50}Fe_{50}$ and the fill material comprises $Al_2O_3$.

13. A method of constructing a bi-layer trailing shield for a perpendicular magnetic write element, the method comprising:
    depositing a non-magnetic, electrically conductive seed layer;
    forming a first photoresist frame over the seed layer, the photoresist frame having an opening that exposes a portion of the underlying seed layer;
    depositing a first layer of magnetic material into the opening in the first photoresist frame;
    forming a second photoresist frame, the second photoresist frame having an opening that exposes at least a portion of the first layer of magnetic material; and
    depositing a second layer of magnetic material into the opening in the second photoresist frame;
    wherein the second photoresist frame is constructed at least partially over the first photoresist frame.

14. A method of constructing a bi-layer trailing shield for a perpendicular maignetic write element, the method comprising:
    depositing a non-magnetic, electrically conductive seed layer;
    forming a first photoresist frame over the seed layer, the photoresist frame having an opening that exposes a portion of the underlying seed layer;
    depositing a first layer of magnetic material into the opening in the first photoresist frame;
    forming a second photoresist frame, the second photoresist frame having an opening that exposes at least a portion of the first layer of magnetic material; and
    depositing a second layer of magnetic material into the opening in the second photoresist frame;
    further comprising before forming the second photoresist frame, performing a chemical mechanical polishing process remove at least a portion of the first photoresist frame.

15. A method of constructing a bi-layer trailing shield for a perpendicular magnetic write element, the method comprising:
    depositing a non-magnetic, electrically conductive seed layer;
    forming a first photoresist frame over the seed layer, the photoresist frame having an opening that exposes a portion of the underlying seed layer;
    depositing a first layer of magnetic material into the opening in the first photoresist frame;
    forming a second photoresist frame, the second photoresist frame having an opening that exposes at least a portion of the first layer of magnetic material; and
    depositing a second layer of magnetic material into the opening in the second photoresist frame;
    further comprising, before forming the second photoresist frame, removing the first photoresist frame.

16. A method of constructing a bi-layer trailing shield for a perpendicular magnetic write element, the method comprising:
    depositing a non-magnetic, electrically conductive seed layer;
    forming a first photoresist frame over the seed layer, the photoresist frame having an opening that exposes a portion of the underlying seed layer;
    depositing a first layer of magnetic material into the opening in the first photoresist frame;

forming a second photoresist frame, the second photoresist frame having an opening that exposes at least a portion of the first layer of magnetic material; and depositing a second layer of magnetic material into the opening in the second photoresist frame; wherein the opening in the first photoresist frame has a first back wall defining a first distance H1 from an ABS plane, the opening in the second photoresist frame has a second back wall defining a second distance H2 from the ABS plane; and the first distance H1 is greater than the second distance H2.

17. A method as in claim 16 wherein the write element has a trackwidth and H1 is equal to about ½ the trackwidth.

18. A method of constructing a bi-layer trailing shield for a perpendicular magnetic write element, the method comprising:

depositing a non-magnetic, electrically conductive seed layer;

forming a first photoresist frame over the seed layer, the photoresist frame having an opening that exposes a portion of the underlying seed layer;

depositing a first layer of magnetic material into the opening in the first photoresist frame;

forming a second photoresist frame, the second photoresist frame having an opening that exposes at least a portion of the first layer of magnetic material; and depositing a second layer of magnetic material into the opening in the second photoresist frame; wherein:

the opening in the opening in the first photoresist layer defines first and second laterally opposed side walls separated by a distance W1 as measured parallel to an ABS plane;

the opening in the second photoresist frame defines third and fourth laterally opposed side wall separated by a distance of W2 as measured in a direction parallel with the ABS plane; and wherein the second distance W2 is greater than the first distance W1.

19. A method of constructing a bi-layer trailing shield for a perpendicular magnetic write element, the method comprising:

depositing a non-magnetic, electrically conductive seed layer;

forming a first photoresist frame over the seed layer, the photoresist frame having an opening that exposes a portion of the underlying seed layer;

depositing a first layer of magnetic material into the opening in the first photoresist frame;

forming a second photoresist frame, the second photoresist frame having an opening that exposes at least a portion of the first layer of magnetic material; and depositing a second layer of magnetic material into the opening in the second photoresist frame; wherein the first magnetic layer has a first thickness D1 measured in a down track direction;

the second magnetic layer has a second thickness D2 measured in a down track direction; and D2 is greater than D1.

* * * * *

UNITED STATES PATENT AND TRADEMARK OFFICE
CERTIFICATE OF CORRECTION

PATENT NO. : 7,446,980 B2 Page 1 of 1
APPLICATION NO. : 10/976476
DATED : November 4, 2008
INVENTOR(S) : Le It is certified that error appears in the above-identified patent and that said Letters Patent is hereby corrected as shown below:

In claim 14, column 10, lines 21-22, replace "maignetic write element, the method compns-ing" with --magnetic write element, the method comprising--.

Signed and Sealed this

Twenty-seventh Day of July, 2010

David J. Kappos
*Director of the United States Patent and Trademark Office*